United States Patent [19]

Lissaman et al.

[11] 3,934,923
[45] Jan. 27, 1976

[54] AIR DECELERATOR FOR TRUCK CAB

[75] Inventors: Peter B. S. Lissaman, Pasadena; Jack H. Lambie, Anaheim, both of Calif.

[73] Assignee: Aerovironment Inc., Pasadena, Calif.

[22] Filed: Mar. 7, 1975

[21] Appl. No.: 556,210

[52] U.S. Cl. .................. 296/1 S; 105/2 R; 296/91
[51] Int. Cl.² ........................................... B62D 35/00
[58] Field of Search ....... 296/1 S, 91; 105/2 R, 2 A, 105/2 B; 180/1 FV

[56] References Cited
UNITED STATES PATENTS

| | | | |
|---|---|---|---|
| 2,177,887 | 10/1939 | Huet | 296/1 S |
| 2,243,906 | 6/1941 | Huet | 296/1 S |
| 3,241,876 | 3/1922 | Saunders | 296/1 S |
| 3,529,862 | 9/1970 | Jousserandot | 296/91 |
| 3,797,879 | 3/1974 | Edwards | 296/91 |
| 3,817,572 | 6/1974 | Francis | 296/1 S |
| 3,822,910 | 7/1974 | Wiley Jr. | 296/1 S |

FOREIGN PATENTS OR APPLICATIONS 616,163 12/1945 United Kingdom ................ 296/1 S

*Primary Examiner*—Robert J. Spar
*Assistant Examiner*—Donald W. Underwood
*Attorney, Agent, or Firm*—William W. Haefliger

[57] ABSTRACT

A drag reducing means for a truck includes a porous structure typically mounted on the cab roof to pass air into the gap between the cab and trailer body in rearward flowing streams that undergo deceleration. Eddies are formed in the gap and act as a barrier to airflow into the gap at its sides and top.

18 Claims, 16 Drawing Figures

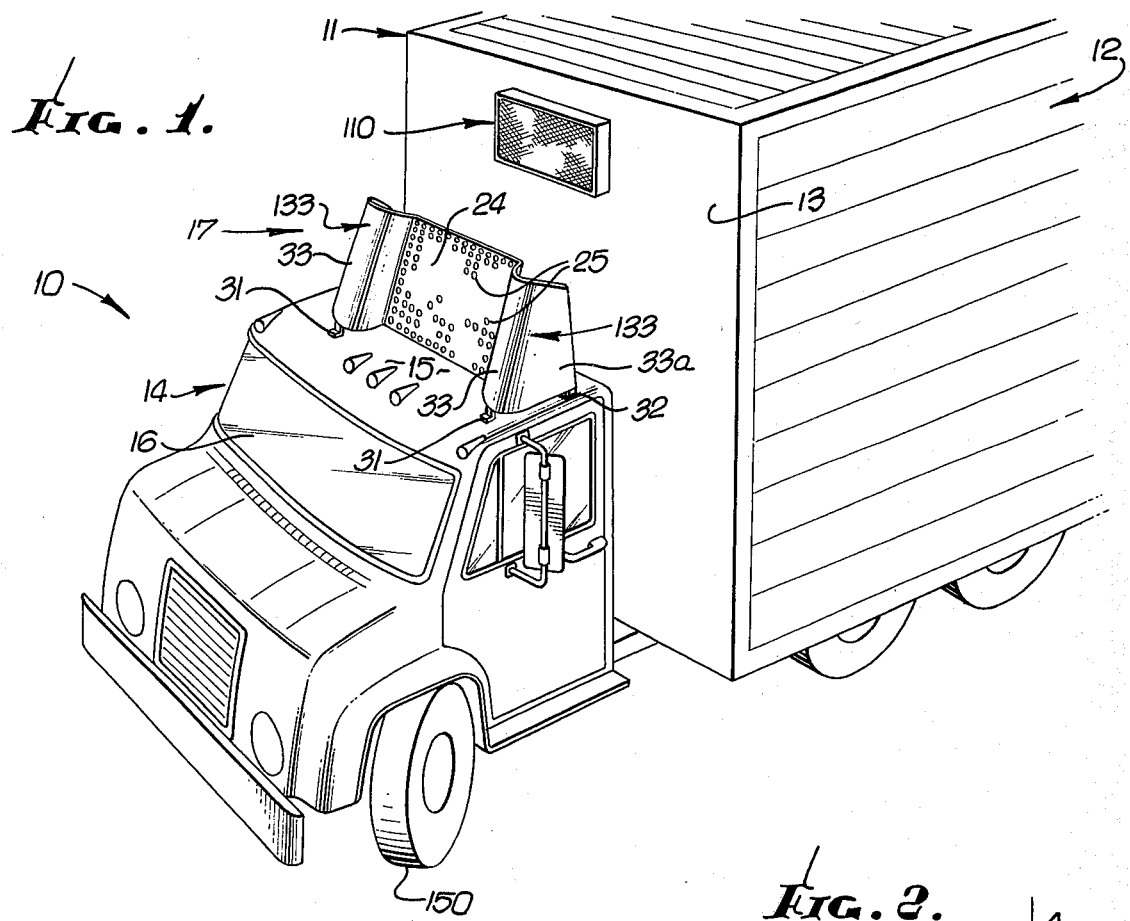
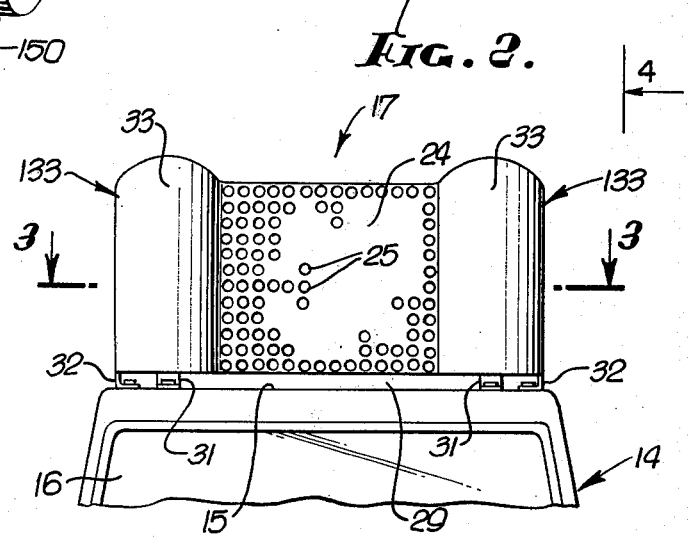
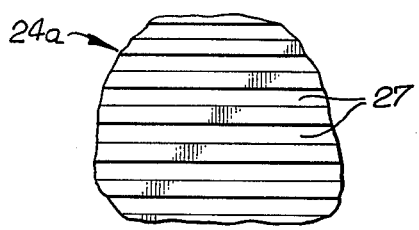
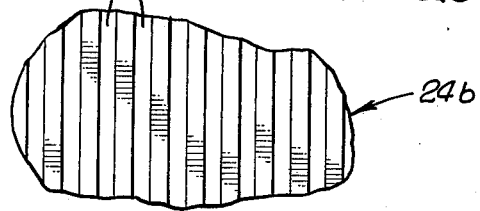

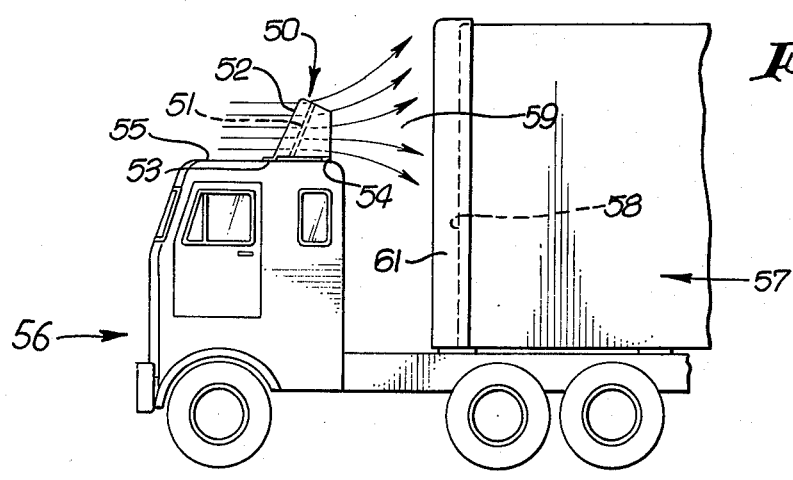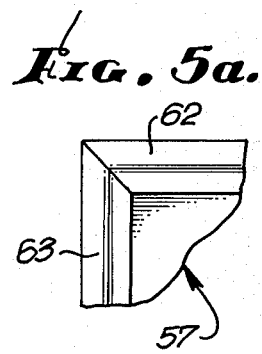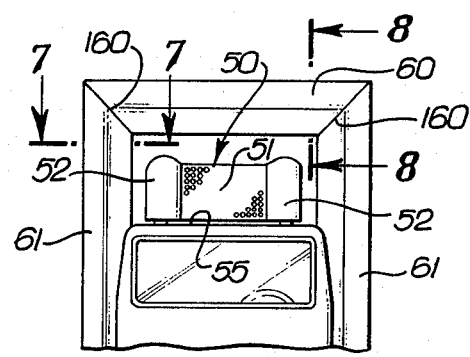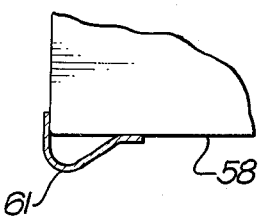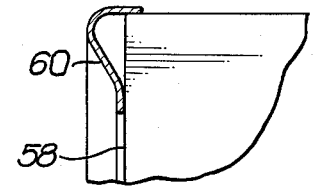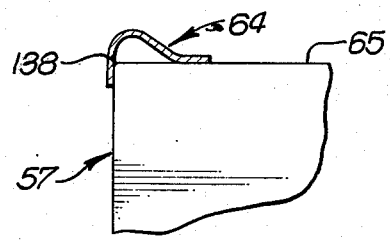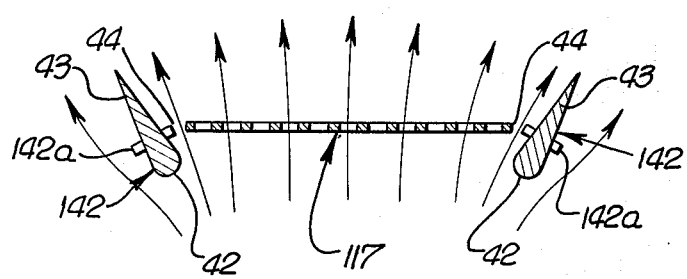

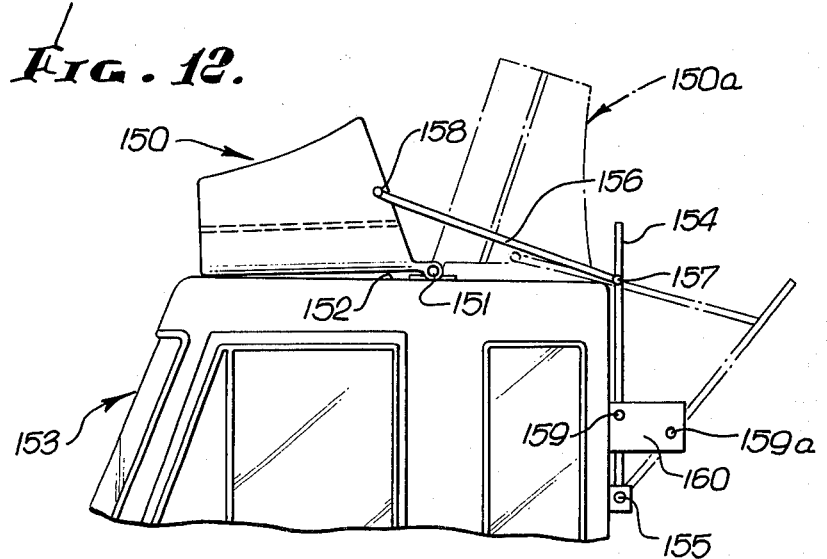
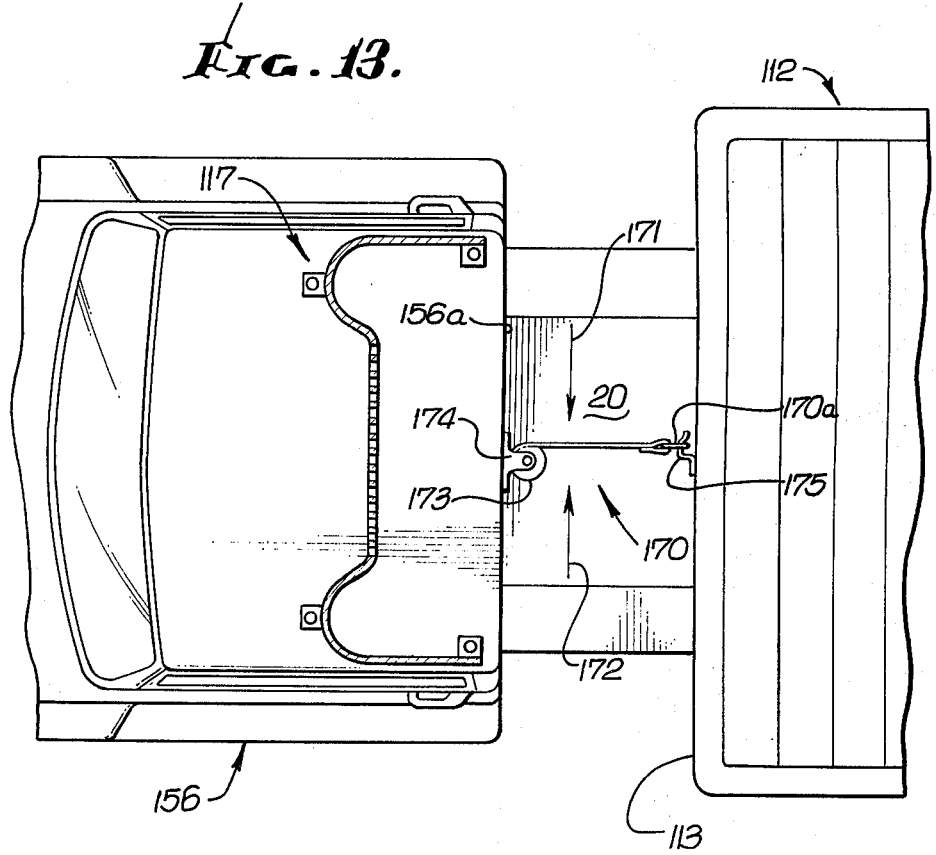

AIR DECELERATOR FOR TRUCK CAB

BACKGROUND OF THE INVENTION

This invention relates generally to reducing aerodynamic drag on vehicles such as trucks, trailors, etc. More particularly, it concerns the provision of means to eliminate or reduce the drag inducing effect of airflow through the gap between vehicle components, as for example between truck tractor and trailer units.

It is found that a major cause of aerodynamic drag in tractor-trailer or tractor semi-trailer combinations, is the gap between the tractor and trailer units. Certain of the relative airflow over the tractor cab passes downwardly into the gap and then outwardly at the gap bottom and lateral sides, disturbing the airflow along the vehicle and creating drag. Lateral cross-winds or gusts entering the gap have the same drag inducing effect. While certain so-called air deflectors have been provided on tractor cabs in the past, they do not operate in the manner provided by the present invention to reduce drag induced by airflow through the gap, and they tend to produce airflow conditions which do not sufficiently resist cross-wind flow into the gap.

SUMMARY OF THE INVENTION

It is a major object of the invention to provide a drag reducing means that operates to decelerate relative airflow rearwardly into the gap, thereby to create air pressure conditions in the gap that tend to divert or prevent cross-wind flow through the gap, thereby lessening drag. Basically, the drag reducing means comprises:

a. porous structure adapted to be mounted on the truck to project above the cab roof and extend laterally, so as to be presented forwardly toward oncoming relative airflow for passing air rearwardly therethrough toward the front of the body, with accompanying air deceleration relative to the truck, and b. airflow directing means at laterally opposite ends of the structure for directing oncoming relative airflow laterally around said ends.

As will be seen, the porous structure extends upright and preferably contains through openings which may for example be circular, linear or have other shape; also the porous structure preferably has plate form and is spaced above the roof of the tractor cab to provide an additional air decelerating passage directly above the roof. Further, the airflow directing means may define forwardly protruding, upright surfaces at laterally opposite sides of the porous structure, whereby the combined porous plate and flow directing protrusions are forwardly concave. The lateral sides of the protrusions preferably extend rearwardly to block cross-wind disturbance of the decelerating flow rearwardly of the porous structure, and the latter may be integral with or spaced laterally from the airflow directing means, as will be seen.

It is a further object of the invention to provide a protrusion or protrusions on the front wall and/or sides and/or top of the trailer unit to cooperate with the drag reducing means to further lessen drag, in the manner to be described.

These and other objects of advantages of the invention, as well as the details of illustrative embodiments, will be more fully understood from the following description and drawings, in which:

DRAWING DESCRIPTION

FIG. 1 is a perspective showing of a truck incorporating the invention;

FIG. 2 is a frontal view of the drag reducing device shown in FIG. 1;

FIG. 5 is a side elevation showing a modified form of the invention;

FIG. 5a is fragmentary side elevation;

FIG. 6 is a front elevation of the FIG. 5 modification;

FIGS. 7 and 8 are fragmentary sections on lines 7—7 and 8—8, respectfully, of FIG. 6;

FIG. 8a is like FIG. 8;

FIGS. 9 and 10 are front elevations of alternative porous plates;

FIG. 11 is a top plan view showing a modification;

FIG. 12 is a side view showing a further modification;

FIG. 13 is another top plan view showing an additional modification; and

Figure 13A:
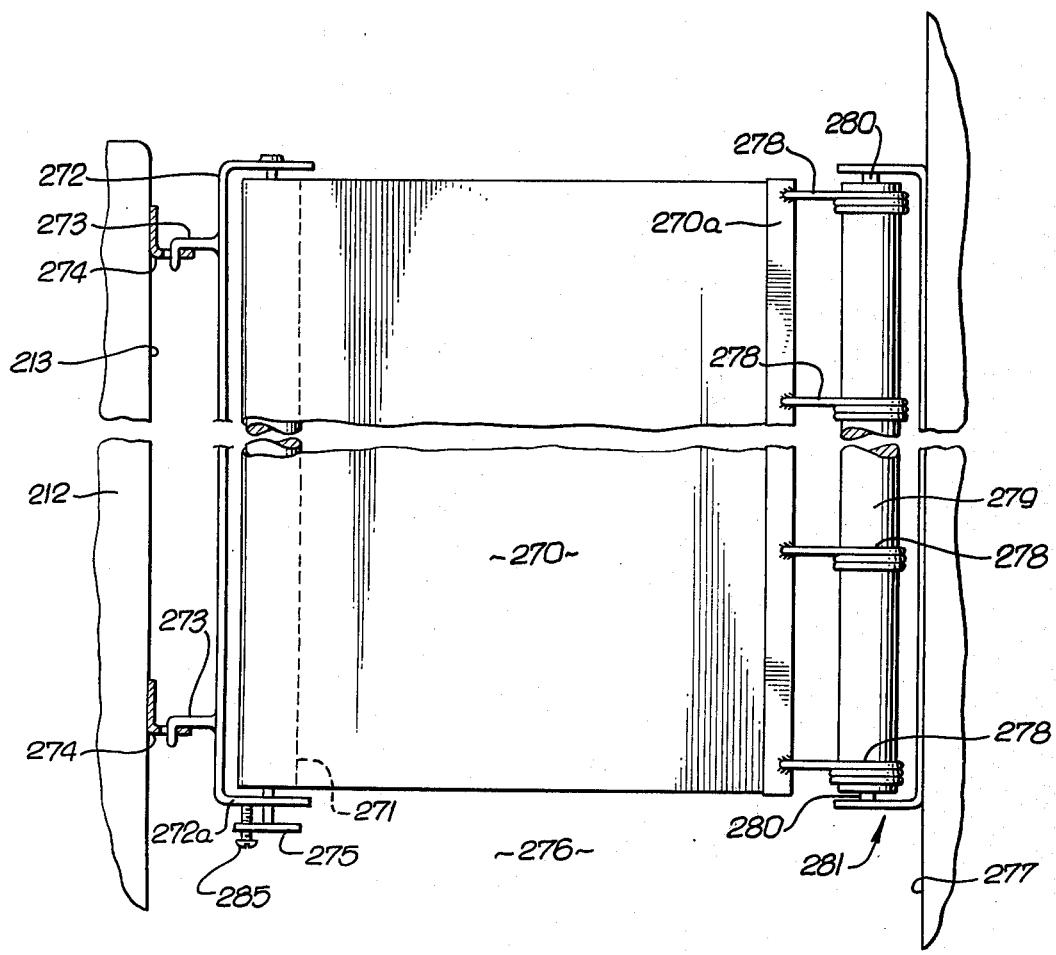

FIG. 13a shows a modification, in elevation.

DETAILED DESCRIPTION

Referring first to FIG. 1, a truck tractor 10 is shown pulling a truck trailer unit 11. The body 12 of the latter has an upstanding front wall 13 rearwardly of the tractor cab 14, and projecting upwardly above the roof level 15 of the cab. The tractor also conventionally includes wheels 150 and front windshield 16.

Figure 3:
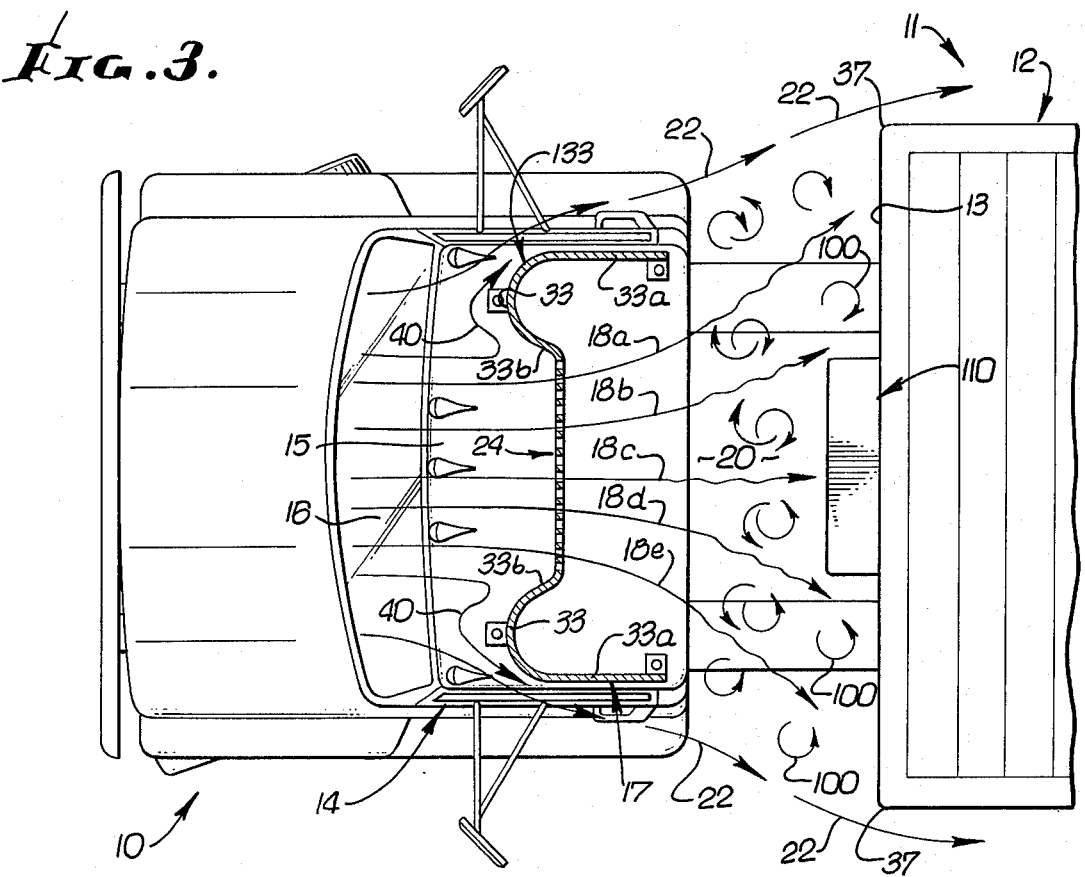
FIG. 3 is a section on lines 3—3 of FIG. 2.

In accordance with the invention, drag reducing means comprises porous structure, as for example that shown at 17 in FIGS. 1–3, adapted to be mounted on the truck to project upwardly above the roof 15, and to extend laterally so as to be presented forwardly toward oncoming relative airflow. The porous structure is such as to pass oncoming air rearwardly therethrough toward the front 13 of the body 12, as indicated by the arrows 18a–18e in FIG. 3, and arrows 19a–19f in FIG. 4. Deceleration of the airflow relative to the truck is thereby achieved, as indicated by the divergence of such arrows at the rear of the structure 17, and a region of flow turbulence characterized by a large number of small eddy currents is apparently formed. Such small eddies are shown at 100 and are produced in the region 20, appearing to serve as a barrier to airflow into that region from the sides and top, as is clear from the flow arrows 22 in FIG. 3 and 23 in FIG. 4. The average flow velocities in the eddies are relatively low, which contributes to stabilization of the air mass in the gap. This is significantly different from large scale vortices produced by an imperforate shield, which cause high fluctuating velocities and actually induce airflow into the gap from the sides and top. Further, the screen type unit 17 is subject to greatly reduced air loading and consequently reduces cab roof loading, as compared to an impervious air shield; also, unsteady buffeting is reduced, and the truck driver achieves a smoother ride.

Figure 4:
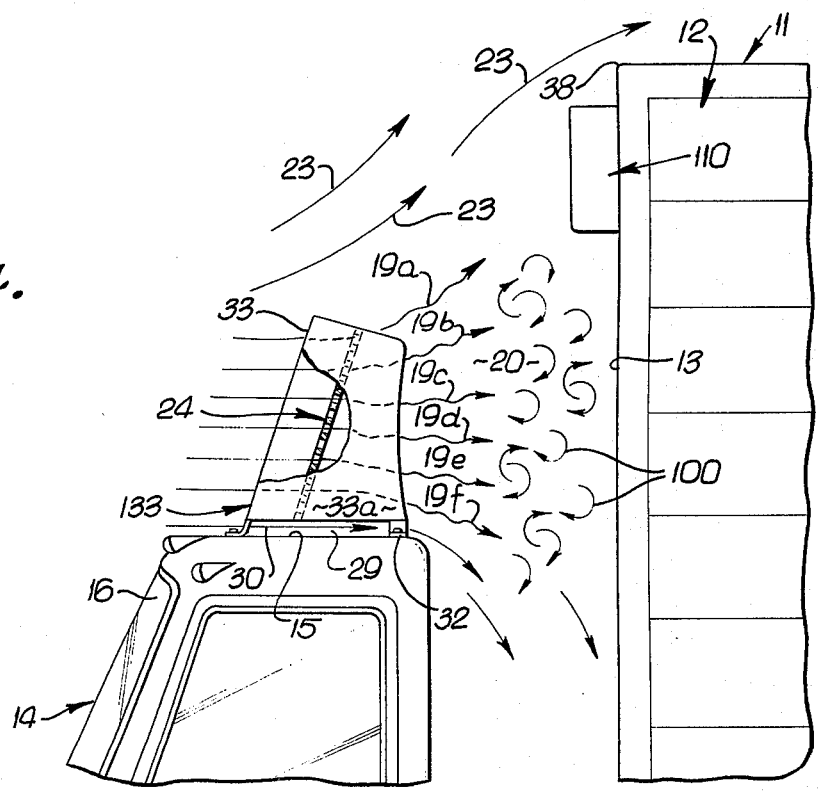
FIG. 4 is a side elevation on lines 4—4 of FIG. 2.

The porous structure may with unusual advantage comprise a porous plate 24 forming spaced apart, generally circular, through openings 25 as seen in FIGS. 2 to 4. Alternatively, FIG. 9 shows linearly elongated horizontal openings 27 in modified porous plate 24a, and FIG. 10 shows linearly elongated vertical openings 28 in modified porous plate 24b. It is also clear from FIGS. 1, 2 and 4 that the porous structure is preferably mounted on the cab 14 in spaced relation above the cab roof 15, to provide an opening or gap 29 between the lowermost extent of the porous structure and roof, and which provides for additional air deceleration, in the manner described above. See flow arrow 30 through that gap or opening in FIG. 4. Mounting brackets 31 and 32 may be provided for this purpose.

The drag reducing means also includes airflow directing means at laterally opposite sides of the porous structure for directing oncoming relative airflow around the laterally opposite ends of the porous structure. As shown in FIGS. 1–4, the airflow directing means 133 may with unusual advantage define surfaces 33 which are generally vertically elongated and project with forward convexity forwardly of a plane defined by the forward face of plate 24. The surfaces also have rearward extensions or skirts 33a which extend rearwardly of the plane of the plate 24, at the lateral boundaries of the airflow directing means. The arrows 22 in FIG. 3 indicate that airflow is directed toward the lateral sides of the region 20 previously described and that such flow is directed around the sharp corners or edges 37 at the lateral boundaries of body front wall 13; similarly, the arrows 23 in FIG. 4 indicate that airflow is directed toward the top of the region, and over the top edge of corner 38 at the upper boundary of body front wall 13. Furthermore, such flow paths tend to keep cross-wind gusts out of the region or gap 20 so as to eliminate or lessen drag that would otherwise be produced as a result of cross-wind flow through that gap. Thus, the vanes tend to rectify the cross-wind flow.

In FIGS. 1–4, the flow directing means 133 is advantageously made integral with the porous structure 17, i.e., as a single sheet or plate of material, such as molded glass fibers and resin. The brackets 31 are shown as attached to the lower extremities of the means 133, which is spaced above the cab roof 15. Arrows 40 in FIG. 3 show oncoming airflow directed laterally reversely around the surfaces 33, forwardly of those portions 33b of surface 33 which concavely merge with lateral extents of plate 24. Accordingly, the surfaces 33 and plate 24 define a generally forwardly concave unit, with U-shaped cross sections in horizontal planes.

FIGS. 1–4 also show the employment of a refrigeration unit 110 mounted on the body front wall 13, for receiving impingement of airflow acting to transfer heat from the unit to the atmosphere. Such heat is typically extracted from coolant fluid circulated into the interior of the body 12 to maintain that interior at a low temperature. The present invention does not impede the flow of air to the unit 110 and thereby enables it to function efficiently. This is to be distinguished from generally air impervious air shields mounted on the cab and which deflect the air around the gap 20 and as a result "starve" the refrigeration unit of cooling air, resulting in overheating of the refrigerator condenser unit, or of the motor driving the unit.

FIG. 11 shows alternate flow directing means in the form of forwardly directed vanes 142 having convex forward surfaces 42 and rearwardly tapering bodies 43 spaced at 44 from the lateral extents of porous structure 117. Vanes 142 have about the same height as the structure 117, and are attached as by brackets 142a or other suitable means to the cab roof.

Actual tests on a tractor and semi-trailer unit with and without the drag reducer of FIGS. 1–4 show 24% air drag reduction when the reducer was used. Dimensions of the reducer were as follows:

| | |
|---|---|
| Overall Height | 36 inches |
| Width of Porous plate 24 | 40 inches |
| Width of each Flow director 133 | 16 inches |
| Radius of curved surface 33 | 9 inches |
| Diameters of holes 25 | 2½ inches |
| Percentage of plate 24 area occupied by holes 25 | 45–55% |

Extending the description to FIG. 5, a modified drag reducer 50 (for decelerating relative airflow) includes a porous plate 51 and lateral flow directors 52 integral therewith. Brackets 53 and 54 mount the reducer 50 to the roof 55 of truck tractor 56. The truck trailer 57 has a front wall 58, and a forwardly convex protrusion bounding at least a portion of the front wall and spaced rearwardly of the flow decelerating drag reducing means 50. A gap is shown at 59 between the tractor and trailer units 56 and 57, and the means 50 tends to keep cross-winds out of the gap, as described above, and thereby reduce drag.

The protrusion referred to above on wall 58 cooperates with the drag reducer 50, serving to lessen drag to even further extent, and may take the form of the protrusion structure described in co-pending application Ser. No. 503,290 of Paul B. MacCready, Jr., and Peter Lissaman. For example, the forwardly convex protrusion may extend generally horizontally at 60 along the uppermost extent of front wall 58; alternatively, or in addition, the protrusion may extend generally vertically at 61 along sidewardmost extent or extents of the front wall. Protrusions 60 and 61 merge at diagonal locations 160; and FIG. 6 shows that protrusions 61 extend laterally to greater extent than drag reducer 50, while protrusion 60 extends at a level above the top-most level of reducer 50. Finally, as in FIG. 5a additional horizontal and vertical protrusions 62 and 63 may be applied to the side wall or walls of the trailer body 57, in the manner described in said co-pending application, to lessen the effects of cross-winds impinging on the body. Also, a horizontal protrusion 64 may extend above the top surface 65 of the body 57 and laterally, adjacent horizontal corner 138, as seen in FIG. 8a.

Turning to FIG. 12, a unit 150, like that seen at 50 in FIG. 5, is pivotally mounted at 151 to the roof 152 of the tractor cab 153. It is swingable about the horizontal transverse axis of the mount 151 between an up-position as shown in broken lines 150a and a down-position in solid lines in which the structure extends generally horizontally forwardly. In the latter position it offers very little wind resistance, as is desirable when the tractor is being driven with no trailer attached thereto. Actuator means may be connected with the unit 150 to swing same between up and down position as described. One such actuator comprises a manually operable lever 154 pivotally connected with the cab at 155, and a link 156 pivotally connected at 157 to the lever and 158 to the unit 150. In lever forward position, the unit 150 is in down position, and the lever may be held in that position by a clevis pin 159 inserted through the lever and into one opening in a fixed plate 160 attached to the cab. In lever rearward position, the unit 150 is in upright operative (air decelerating) position, and the lever may be held in that position by the clevis pin inserted through the lever and into another opening in the plate, at locus 159a.

Turning to FIG. 13, the tractor cab 156, trailer body 112, and drag reducing unit 117 correspond to elements 56, 12 and 17, respectively, of FIGS. 1–4. Also provided is a flexible curtain 170 extending generally vertically and forwardly in the gap 120 between the cab and trailer body, generally centrally of the gap. The curtain functions to block transverse flow of air through the gap, i.e., airflow in directions indicated by arrows 171 and 172. Curtain 170 may be rolled on a spring-loaded, vertical roller 173 carried at 174 by and adjacent the back wall 156a of the tractor cab. The curtain rearward edge 170a extends adjacent the front wall 113 of the cab and is hooked at 175 to the latter, roller 173 tensioning the curtain, as by urging it rearwardly in a roll-up direction at all times. Thus, the curtain is maintained taut as the tractor turns relative to the trailer during operation of the rig.

In the FIG. 13a modification, the flexible curtain 270 extending in a vertical, forwardly extending plane, is wound on a vertical spool 271 carried by frame 272. Attachment means, such as hooks 273 on the frame, and eye brackets 274 on the trailer body front wall 213, removably attach the frame and curtain to the trailer body 212. For example, the hooks are receivable in the eye brackets, as shown. An adjustment handle 275 on the spool is rotatable to control the unwound length of the curtain 270 extending in the gap 276 between the body front wall 213 and the tractor cab rear wall 277.

The forward edge portion 270a of the curtain 270 is attached to cables 278 which are spooled on a vertical drum 279. The latter is spring-urged, internally, to tend to wind the cables, thereby to maintain the curtain 270 taut, as in FIG. 13, and the drum yields to unspool the tensioned cables when the tractor turns relative to the tractor, widening gap 276. Drum axles 280 are carried by bracket 281 attached to the tractor cab rear wall 277.

In use, the truck operator need only hook the bracket 272 onto a trailer, and adjust the length of the curtain 270 to the width of the gap, as by turning handle 275. A suitable locking means, such as at 285, is provided to lock the curtain spool 271 against turning relative to bracket 272, when the curtain is selectively extended as shown, and tensioned as by the cables and drum 279. Element 285 is shown as a lug thread connected to the handle 275, and capable of selective advancement to engage openings in the bracket part 272a, and retraction to free the handle for turning.

I claim:

1. For combination with a truck having a cab and a body rearwardly of the cab, drag reducing means comprising
   a. porous structure including an upright plate adapted to be mounted on the truck to project above the cab roof and extend laterally, so as to be presented forwardly toward oncoming relative airflow for passing air rearwardly therethrough toward the front of said body, with accompanying air energy reduction and deceleration relative to the truck, said plate defining multiple through openings presented forwardly and distributed widely both vertically and laterally over the plate area, and
   b. air flow directing means at laterally opposite ends of said structure and integral therewith for directing oncoming relative airflow laterally around said ends, said airflow directing means defining nonporous solid surfaces which are generally vertically elongated and substantially co-extensive in height with said upright plate and project with forward convexity forwardly of a plane defined by the plate front face, said surfaces also extending rearwardly of said plane at the lateral boundaries of said airflow directing means.

2. The drag reducing means of claim 1 wherein said openings are spaced apart and generally circular.

3. The drag reducing means of claim 1 wherein said openings are spaced apart and generally linearly elongated.

4. The drag reducing means of claim 1 including mounting means for mounting the plate on the cab roof so that the lowermost extent of the plate is spaced above said roof.

5. The drag reducing means of claim 1 wherein said airflow directing means comprise forwardly directed air diverters.

6. For combination with a truck having a cab and a body rearwardly of the cab, drag reducing means comprising
   a. porous structure including an upright plate adapted to be mounted on the truck to project above the cab roof and extend laterally, so as to be presented forwardly toward oncoming relative airflow for passing air rearwardly therethrough toward the front of said body, with accompanying air energy reduction and deceleration relative to the truck, said plate defining multiple through openings presented forwardly and distributed widely both vertically and laterally over the plate area, and
   b. airflow directing means at laterally opposite ends of said structure and integral therewith for directing oncoming relative airflow laterally around said ends, said airflow directing means defining surfaces which are generally vertically elongated and project with forward convexity forwardly of a plane defined by the plate front face,
   c. said plate and those portions of said surfaces closest to the plate having generally U-shaped cross sections in horizontal planes intersecting the plate, said cross sections being forwardly concave.

7. The drag reducing means of claim 1 wherein said openings subtend between 45 and 55 percent of the plate area.

8. In combination with a truck having a cab and a body rearwardly of the cab, drag reducing means comprising
   a. porous structure including an upright plate mounted on the truck to project above the cab roof and extend laterally, so as to be presented forwardly toward oncoming relative airflow for passing air rearwardly therethrough toward the front of said body, with accompanying air energy reduction and deceleration relative to the truck, said plate defining multiple through openings presented forwardly and distributed widely both vertically and laterally over the plate area, and
   b. airflow directing means at laterally opposite ends of said structure and integral therewith for directing oncoming relative airflow laterally around said ends, said airflow directing means defining non porous solid surfaces which are generally vertically elongated and substantially co-extensive in height with said upright plate and project with forward convexity forwardly of a plane defined by the plate front face, said surfaces also extending rearwardly of said plane at the lateral boundaries of said airflow directing means:

9. The combination of claim 8 wherein the truck body has a front wall and a forwardly convex protrusion bounding at least a portion of said front wall spaced generally rearwardly of said drag reducing means.

10. The combination of claim 9 wherein the protrusion extends generally horizontally along the uppermost extent of said front wall.

11. The combination of claim 9 wherein said protrusion extends generally vertically along at least one sidewardmost extent of said front wall.

12. The combination of claim 10 wherein said protrusion also extends generally vertically along laterally spaced sidewardmost extents of said front wall.

13. The combination of claim 8 wherein the truck body has a side wall, and a sidewardly convex protrusion bounding at least a portion of said side wall and spaced generally rearwardly and laterally of said drag reducing means.

14. The combination of claim 8 wherein the truck body has a top surface, and an upwardly convex protrusion extending laterally along the forwardmost extent of said top surface.

15. The combination of claim 8 including a refrigeration unit on the body and presented toward said decelerated air that has passed through said porous structure.

16. The combination of claim 1 including said truck cab, said porous structure pivotally mounted on the cab to be swung between an up-position wherein said structure is presented forwardly toward said oncoming airflow, and a down-position in which said structure extends generally horizontally forwardly.

17. The combination of claim 16 including actuator means connected with said structure to swing said structure between said positions.

18. In combination with a truck having a cab and a body rearwardly of the cab, drag reducing means comprising porous structure mounted on the truck to project above the cab roof and extend laterally so as to be presented forwardly toward oncoming relative airflow for passing air rearwardly therethrough to the space directly rearwardly of said structure and forwardly of the truck body, with accompanying deceleration of such flow relative to the truck, there being a flexible curtain extending generally vertically and forwardly in the gap between the cab and said body to block transverse flow of air through said gap, the curtain being disposed along the center portion of the truck and operatively connected between the cab and the truck body directly rearwardly of the cab, the forward length of the curtain being adjustable to accommodate to variations in the forward length of the gap in response to turning of the cab relative to the body.

* * * * *